(12) United States Patent
Green et al.

(10) Patent No.: US 10,025,509 B2
(45) Date of Patent: Jul. 17, 2018

(54) BACKGROUND MIGRATION OF VIRTUAL STORAGE

(71) Applicant: Microsoft Technology Licensing, LLC, Redmond, WA (US)

(72) Inventors: Dustin L. Green, Redmond, WA (US); Jacob K. Oshins, Seattle, WA (US); Lars Reuther, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/789,860

(22) Filed: Jul. 1, 2015

(65) Prior Publication Data

US 2016/0004467 A1   Jan. 7, 2016

Related U.S. Application Data

(60) Continuation of application No. 14/300,163, filed on Jun. 9, 2014, now Pat. No. 9,081,510, which is a
(Continued)

(51) Int. Cl.
*G06F 3/06* (2006.01)
*G06F 11/20* (2006.01)
(Continued)

(52) U.S. Cl.
CPC ............ *G06F 3/0619* (2013.01); *G06F 3/065* (2013.01); *G06F 3/067* (2013.01); *G06F 3/0617* (2013.01);
(Continued)

(58) Field of Classification Search
CPC . H04L 67/1097; G06F 3/0619; G06F 3/0689; G06F 3/0665; G06F 3/0647;
(Continued)

(56) References Cited

U.S. PATENT DOCUMENTS 5,842,011 A    11/1998   Basu
5,926,834 A *   7/1999   Carlson ............... G06F 12/0862
                                                 711/118
(Continued)

FOREIGN PATENT DOCUMENTS

CN         2569238       8/2003
CN       101216805 A     7/2008
(Continued)

OTHER PUBLICATIONS

Clark, et al., "Live Migration of Virtual Machines", Retrieved at <<http://www.cl.cam.ac.uk/research/srg/netos/papers/2005-migration-nsdi-pre.pdf>>, 2005, pp. 14.
(Continued)

*Primary Examiner* — Michael Krofcheck

(57) ABSTRACT

Described is a technology by which a virtual hard disk is migrated from a source storage location to a target storage location without needing any shared physical storage, in which a machine may continue to use the virtual hard disk during migration. This facilitates use the virtual hard disk in conjunction with live-migrating a virtual machine. Virtual hard disk migration may occur fully before or after the virtual machine is migrated to the target host, or partially before and partially after virtual machine migration. Background copying, sending of write-through data, and/or servicing read requests may be used in the migration. Also described is throttling data writes and/or data communication to manage the migration of the virtual hard disk.

20 Claims, 6 Drawing Sheets

Related U.S. Application Data division of application No. 12/701,630, filed on Feb. 8, 2010, now Pat. No. 8,751,738.

(51) Int. Cl.
  *G06F 9/455* (2018.01)
  *H04L 29/08* (2006.01)

(52) U.S. Cl.
  CPC .......... *G06F 3/0647* (2013.01); *G06F 3/0659* (2013.01); *G06F 3/0665* (2013.01); *G06F 3/0689* (2013.01); *G06F 9/45558* (2013.01); *G06F 11/2066* (2013.01); *H04L 67/1097* (2013.01); *G06F 2009/45579* (2013.01)

(58) Field of Classification Search
  CPC ........ G06F 3/065; G06F 3/0617; G06F 3/067; G06F 3/0659; G06F 3/0604; G06F 3/0607; G06F 3/0655; G06F 3/0662; G06F 9/45558; G06F 9/5088; G06F 9/4856; G06F 2009/45579; G06F 2009/4557; G06F 11/2066
  See application file for complete search history.

(56) References Cited

U.S. PATENT DOCUMENTS

| | | | |
|---|---|---|---|
| 6,075,938 A | 6/2000 | Bugnion et al. | |
| 6,925,533 B2 | 8/2005 | Lewis | |
| 7,281,124 B2 | 10/2007 | Rothman et al. | |
| 7,366,868 B2 | 4/2008 | Reuter et al. | |
| 7,406,617 B1 | 7/2008 | Athreya et al. | |
| 7,484,208 B1 | 1/2009 | Nelson | |
| 7,640,409 B1 | 12/2009 | Stafford et al. | |
| 8,370,597 B1 | 2/2013 | Chatterjee et al. | |
| 2003/0028737 A1* | 2/2003 | Kaiya | G06F 3/0601 711/162 |
| 2003/0039148 A1* | 2/2003 | Riedle | G06F 3/0601 365/189.08 |
| 2003/0212872 A1 | 11/2003 | Patterson et al. | |
| 2005/0010326 A1 | 1/2005 | Hayward et al. | |
| 2005/0071560 A1 | 3/2005 | Bolik | |
| 2005/0172073 A1 | 8/2005 | Voigt et al. | |
| 2005/0289218 A1 | 12/2005 | Rothman et al. | |
| 2006/0005189 A1 | 1/2006 | Vega et al. | |
| 2006/0031651 A1* | 2/2006 | Nonaka | G06F 3/0607 711/163 |
| 2006/0155944 A1* | 7/2006 | Kano | G06F 3/0623 711/161 |
| 2007/0180436 A1 | 8/2007 | Travostino et al. | |
| 2007/0234337 A1 | 10/2007 | Suzuki et al. | |
| 2007/0260831 A1 | 11/2007 | Michael et al. | |
| 2007/0294676 A1 | 12/2007 | Mellor et al. | |
| 2008/0172448 A1 | 1/2008 | Wonus | |
| 2008/0086611 A1 | 4/2008 | Fujibayashi | |
| 2008/0104587 A1 | 5/2008 | Magenheimer et al. | |
| 2008/0154987 A1* | 6/2008 | Kottomtharayil | G06F 11/1448 |
| 2008/0155208 A1 | 6/2008 | Hiltgen et al. | |
| 2008/0222375 A1 | 9/2008 | Kotsovinos et al. | |
| 2008/0263258 A1 | 10/2008 | Allwell et al. | |
| 2009/0006534 A1 | 1/2009 | Fries et al. | |
| 2009/0037679 A1 | 2/2009 | Kaushik et al. | |
| 2009/0037680 A1 | 2/2009 | Colbert et al. | |
| 2009/0089781 A1 | 4/2009 | Shingai et al. | |
| 2009/0144389 A1 | 6/2009 | Sakuta | |
| 2009/0177916 A1* | 7/2009 | Tokoro | G06F 11/2056 714/6.12 |
| 2009/0204650 A1 | 8/2009 | Wong et al. | |
| 2009/0240790 A1 | 9/2009 | Utsunomiya et al. | |
| 2009/0240975 A1 | 9/2009 | Shitomi et al. | |
| 2010/0037041 A1 | 2/2010 | Joshi et al. | |
| 2010/0153947 A1 | 6/2010 | Haruma | |
| 2010/0161922 A1 | 6/2010 | Sharp et al. | |
| 2010/0241807 A1 | 9/2010 | Wu et al. | |
| 2010/0333089 A1 | 12/2010 | Talwar et al. | |
| 2011/0066597 A1* | 3/2011 | Mashtizadeh | G06F 3/0617 707/640 |
| 2011/0145380 A1* | 6/2011 | Glikson | G06F 9/4856 709/223 |
| 2011/0145471 A1* | 6/2011 | Corry | G06F 9/4856 711/6 |

FOREIGN PATENT DOCUMENTS

| | | |
|---|---|---|
| CN | 101278270 A | 10/2008 |
| CN | 101599995 A | 12/2009 |
| WO | 1998/040810 A2 | 9/1998 |
| WO | 2006/050455 A2 | 5/2006 |
| WO | 2007002397 A2 | 1/2007 |
| WO | 2008073618 A2 | 6/2008 |

OTHER PUBLICATIONS

Ta-Shma, et al., "Virtual Machine Time Travel Using Continuous Data Protection and Checkpointing", Retrieved at <<http://www.mulix.org/pubs/cdpvm/systor07-4-ta-shma.pdf>>, Oct. 29, 2007, pp. 8.

Hirofuchi, et al., "A Live Storage Migration Mechanism over WAN for Relocatable Virtual Machine Services on Clouds", Retrieved at <<http://ieeexplore.ieee.org/stamp.jsp?arnumber=05071905>>, 9th IEEE/ACM International Symposium on Cluster Computing and the Grid, May 18-21, 2009, pp. 6.

PCT Search Report, PCT/US2011/021456, Filed date Jan. 17, 2011, dated Aug. 30, 2011, 7 pages.

"First Office Action and Search Report Issued in Chinese Patent Application No. 201180008699.0", dated May 28, 2014, 20 Pages.

Wu, et al., U.S. Appl. No. 61/162,463, "Virtualized Data Storage Over Wide-Area Networks", filed Mar. 23, 2009, pp. 1-31.

Chadha, Vineet, "Provisioning wide-area virtual environments through I/O interposition: The redirect-on-write file system and characterization of I/O overheads in a virtualized platform." University of Florida, 2008, 145 pages.

"Final Office Action Issued in U.S. Appl. No. 12/701,630", dated Sep. 12, 2012, 19 Pages.

"Non Final Office Action Issued in U.S. Appl. No. 12/701,630", dated Feb. 16, 2012, 20 Pages.

"Non Final Office Action Issued in U.S. Appl. No. 12/701,630", dated Sep. 20, 2013, 26 Pages.

"Notice of Allowance Issued in U.S. Appl. No. 12/701,630", dated Jan. 29, 2014, 11 Pages.

"First Office Action and Search Report Issued in Chinese Patent Application No. 201110037391.0", dated Dec. 17, 2014, 11 Pages.

"Notice of Allowance Issued in Chinese Patent Application No. 201180008699.0", dated Dec. 8, 2014, 2 Pages.

"International Preliminary Report on Patentability Issued in PCT Application No. PCT/US11/21456", dated Aug. 14, 2012, 5 Pages.

"Non Final Office Action Issued in U.S. Appl. No. 14/300,163" dated Nov. 7, 2014, 26 Pages.

"Notice of Allowance Issued in U.S. Appl. No. 14/300,163", dated Mar. 10, 2015, 8 Pages.

"Notice of Allowance Issued in U.S. Appl. No. 14/300,163", dated Apr. 8, 2015, 2 Pages.

* cited by examiner

BACKGROUND MIGRATION OF VIRTUAL STORAGE

CROSS-REFERENCE TO RELATED APPLICATION

This application is a continuation of U.S. patent application Ser. No. 14/300,163, filed Jun. 9, 2014. U.S. patent application Ser. No. 14/300,163 is a division of U.S. patent application Ser. No. 12/701,630, which was filed on Feb. 8, 2010 and issued as U.S. Pat. No. 8,751,738 on Jun. 10, 2014. U.S. patent application Ser. No. 14/300,163 and U.S. patent application Ser. No. 12/701,630 are each entitled "Background Migration of Virtual Storage." The entireties of these applications are incorporated herein by reference.

BACKGROUND

Virtual storage (e.g., a virtual hard disk) is basically a file or other storage extent (e.g., a disk, partition on a disk or the like) that is configured to operate as a physical hard disk drive for a computer system. There are various reasons why virtual storage needs to be migrated from a source storage location to a storage location, including load balancing and maintenance. For example, a virtual machine (comprising software executing to act as a physical machine) may be moved (live-migrated) from one host computer to another, by transferring the state of the virtual machine and resuming execution. The state of the virtual machine includes the current state of the virtual processors, the contents of memory, the current state of the virtual devices, and the contents of the disks and/or virtual disks in use by the virtual machine. Typically, the largest amount of data is in the virtual disks.

Many live-migration scenarios utilize SAN (storage area network) technology to avoid copying the entire contents of a virtual disk from the physical storage of one host to the physical storage of another host, because performing an entire copy operation generally takes too much time for live-migration. However, SANs can be expensive. Also, for some datacenters and workloads, the only reason to perform live migrations is to vacate a server so that the server can be rebooted or turned off for software or hardware servicing. This may occur very infrequently, whereby the time to perform a live migration operation is not particularly of concern. In many situations the concern with storage migration is mainly about cost, whereby an expensive SAN solution is not desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a virtual storage extent (e.g., virtual hard disk) is migrated from a source storage location to a target storage location. In one implementation, this may be done without any shared physical storage, e.g., without SAN technology. A host may continue to use the virtual storage data of the virtual storage extent during migration.

In one implementation, the virtual storage extent migration may be part of a virtual machine migration. However, the virtual hard disk migration may occur fully before or after the virtual machine is migrated from a source host computer to a target host computer, which allows virtual machine migration to be rapid. The virtual hard disk migration may also occur partially with respect to the virtual machine migration, in that some part of the data is migrated to the target storage location before the virtual machine is migrated, and some other part of the data is migrated after virtual machine migration. Background copying, sending of written data, and/or servicing read requests may be used to provide the before, after or part-before and part-after migration, as desired. Data writes and/or data communication may be throttled to facilitate migration, including without adversely impacting the network over which migration occurs.

In another implementation, the virtual storage extent migration may serve to move the data of a virtual disk from one physical storage device to another, without moving virtual machine execution to a new host computer. This can be used, for example, to replace a SAN without interrupting usage of the virtual disk.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards transferring virtual storage data (e.g., of a virtual disk) from a source storage location to a target storage location in a background operation, while allowing a computer system (e.g., one or more programs thereon) to continue running using the virtual disk before, during and/or after the migration. As described below, this facilitates a rapid transition, and thus may be used for live migration of a virtual machine including the virtual storage data from one virtual machine host to another. Also described is the migration of virtual storage data from one storage device to another of the same host computer.

As described herein, a target virtual machine host may access the virtual storage data with respect to migration in a number of ways, including migrating a full copy to a storage device of the target host before migrating the virtual machine, or a partial copy such that the data is accessible at two storage locations during the migration. The target host may also take over running of the virtual machine before the migration of the virtual disk data, such as by transferring writes to a storage device of the target host at a high priority, with read data transferred on demand as needed at a high priority while migrating other data in a lower priority background operation. Thus, migration may be accomplished in a way that allows a virtual machine on the target host to begin executing after or before all the virtual disk data is done copying.

While the examples herein are generally directed towards migrating a virtual hard disk (VHD) of a virtual machine (VM) from a source host to a target host, it should be understood that any of the examples described herein are non-limiting examples. Indeed, any virtual storage extent may be migrated, not necessarily only a storage extent configured as a virtual hard disk. Further, the storage may be migrated independent of whether or not the storage migration is part of a virtual machine migration. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data migration in general.

Figure 1:
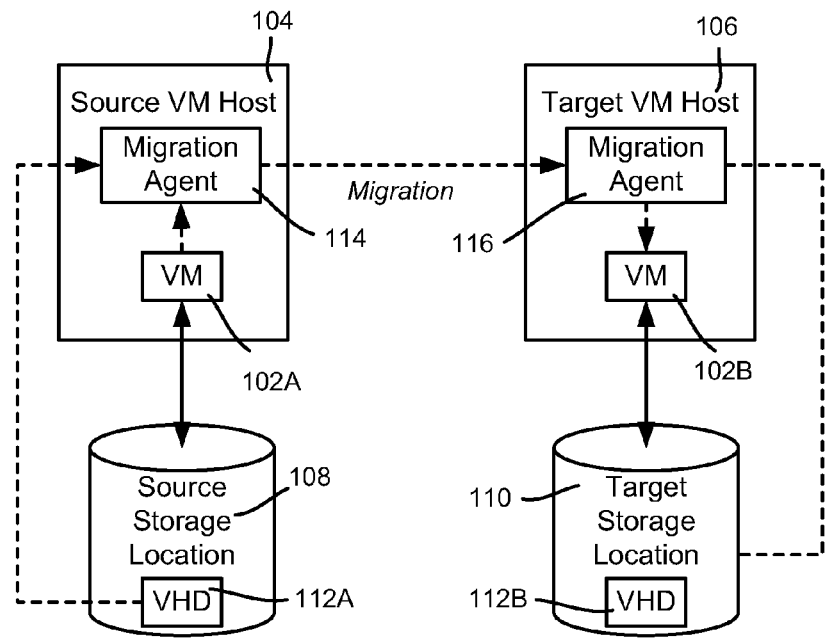
FIG. 1 is a block diagram showing example components for migrating virtual storage data from a source storage location to a target storage location in association with virtual machine migration.

FIG. 1 shows various aspects related to background storage migration in the example of a virtual machine 102A being migrated from a source virtual machine host 104 to a target virtual machine host 106 where the virtual machine will resume running as a virtual machine 102B. Note that a virtual machine is only one example of software that uses virtual storage, which in this example is a virtual hard drive; the virtual hard drive may be used with any software that runs on the source and the target, including the same software on each machine, or different software.

In the example of FIG. 1, the source virtual machine host 104 and target virtual machine host 106 each have their own storage units, shown as source storage locations 108 and 110, respectively, which are not shared between the hosts (even if part of the same physical storage device). As a result, the virtual hard disk instance 112A of the storage 108 needs to be migrated to the storage 110, as represented in FIG. 1 via the virtual hard disk instance 112B. Note that the source host and its storage may be part of the same physical machine as the target host and its storage, however migration is still needed. Further, note that "instance" is meant to differentiate locations, as in actuality there is only one true copy of the virtual hard disk's data, regardless of where that data exists and/or how many physical locations on which it exists. Thus, the term "virtual hard disk" will be used herein instead of "virtual hard disk instance" except for purposes of illustrating different physical locations of all or part of a virtual hard disk.

Figure 2:
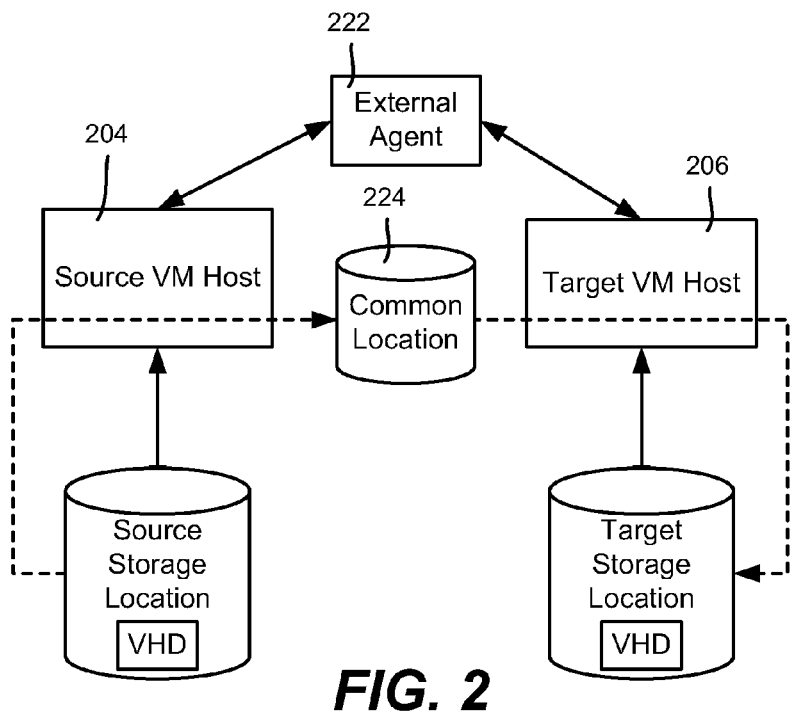
FIG. 2 is a block diagram illustrating variations of components for migrating virtual storage data.

As represented in FIG. 1, in one implementation a source migration agent 114 communicates with a target migration agent 116 to handle the migration of the data. Migration may be performed by any internal or external agent with respect to the hosts (such as a virtual machine management system) that can run on or initiate communication with the source host and target host to start the process of storage migration. FIG. 2 shows an external agent 222 performing the coordination of the data transfer between a source host 204 and a target host 206.

Note that FIG. 1 shows the data being copied from the source host to the target host. As can be readily appreciated, however, the data may be copied from the source host to an intermediate common location accessible to the target host, and/or may be done without being part of any virtual machine migration. FIG. 2 shows such a common location 224. However, FIG. 2 is only illustrating some of the possible implementation variations; an external agent may be used with direct copying without an intermediate common location, and/or no external agent is needed to have the source copy the data to an intermediate common location. In other words, the implementation of FIG. 1 with internal migration agents may be varied to have a common location, while the implementation of FIG. 2 with an external agent may be varied so as to not include an intermediate common location.

With respect to usage with a virtual machine, the background copying of the virtual hard disk data may be decoupled from any virtual machine state, e.g., copying of the virtual hard disk data can proceed while the virtual machine is running on the source host or the target host, or is paused, stopped, deleted, and so forth. The migration of storage data may proceed without a corresponding virtual machine, or with a virtual machine that exists only as configuration parameters (e.g., not fully instantiated at the moment). The migration of storage data may proceed before a virtual machine has ever started for the first time.

Figure 3:
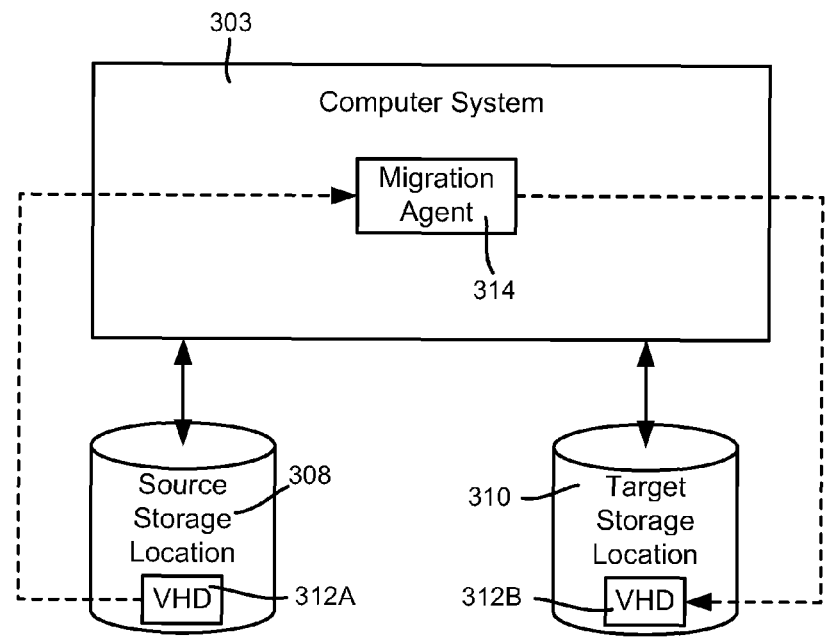
FIG. 3 is a block diagram showing example components for migrating virtual storage data from a source storage location to a target storage location that are both coupled to the same computer system.

FIG. 3 shows another example, in which the same computer system 303 has data of a virtual hard drive 312A migrated (to 312B) from a source storage location 308 to a target storage location 310. In this example, an internal migration agent 314 performs the migration, however the migration agent may be external. Note that in this example, the computer system 303 may not be running a virtual machine, although one likely scenario in this example is to move the virtual disk to a different storage unit without moving the execution of the virtual machine to a new host computer. This can be used, for example, to replace a SAN without interrupting usage of the virtual disk.

Again, note that a virtual machine is not needed with respect to storage migration as described herein, however a virtual machine provides a suitable example of where virtual storage migration is useful, including, for example, that the virtual machine is dependent on the virtual hard drive instance. By dependent, it is meant that the virtual hard drive (or any other entity "X") is needed in order for the virtual machine to continue executing as if nothing has happened. If the virtual hard drive or X were to fail while a virtual machine is dependent on the virtual hard drive or X, the virtual machine is effectively "hard-powered off" and has to boot back up as if it were a real machine that had lost power, for example.

A virtual machine need only be dependent on one virtual machine host at a time. As a result, under steady-state operation, the virtual machine need not be dependent on any hardware external to the virtual machine's current host to continue running. Only during the virtual machine migration operation is a network or other suitable connection used; at other times, the virtual machine is not reliant upon any network connectivity for continued execution.

The network or other connection, represented in FIGS. 1 and 2 (and possibly FIG. 3) via the dashed arrows, may be based on any data transfer mechanism, including data transfer mechanisms that temporarily store data in an intermediate location. Moreover, data transfer can be coordinated to proceed through multiple mechanisms simultaneously, that is, a hybrid transfer may be used which coordinates data transfer using more than one data transfer mechanism.

Examples of suitable data transfer mechanisms include Ethernet, Fibrechannel (FC), RDMA networking, UDP, TCP, and the like. With IP networking over Ethernet, no expensive SAN LUN (a remotely-accessible disk-like device) is needed to transfer the data. A Fibrechannel fabric may be similarly used for data transfer, as it provides a reasonably fast network connection, but without needing storage (and thus not using an expensive SAN LUN on that fabric).

Notwithstanding, virtual storage migration as described herein may still benefit from a SAN LUN if available. For example, a data transfer mechanism may use a SAN LUN to temporarily store data from the source storage location which can then be accessed by a target virtual machine host; the data written and read does not need to be stored in order by virtual disk offset, as long as the source and target virtual machine hosts both have information that specifies the actual order. Thus, when using a technology such as Fibrechannel for data transfer, the data transfer may or may not proceed in a manner analogous to usage of Fibrechannel LUN as a temporary data storage intermediary; the data may get transferred directly from the source to the target location, or may get temporarily stored in a remote LUN by the source and then read from the LUN by the target.

Note that in some network environments, if data copying from the source storage location to the target storage location were allowed to proceed at the network line rate, the network may be adversely impacted, e.g., causing high latency elsewhere. To reduce the impact on the network, the copying of the storage data from the source storage location to the target storage location may be throttled, such as to stay below a limit determined as a percentage of the line rate, for example. If multiple storage migrations are outbound from a source virtual machine host to multiple virtual machine targets, for example, the agent can throttle the send rate for the aggregate outbound data, and can also obey limits specified by target virtual machine hosts, to allow a target virtual machine host some control over inbound network data volume. Throttling may be achieved via hardware or software means (e.g., packet prioritization, or explicit traffic throttling by software). The background copy can be delayed for an indefinite period before starting, can be paused/resumed after starting, and can be stopped before complete.

As described herein, there are numerous ways to migrate a virtual disk. For one, writes may be mirrored, and indeed, a fixed mirroring arrangement may be set up so that migration is regularly ongoing and either the source or target can take over (e.g., as a virtual machine) very quickly. New writes may also be mirrored, with previously existing data transferred in other ways. For example, the target virtual machine host may take over running of the virtual machine before all of the data is transferred, by having any newly-written data written through to the target storage location, with copying from the source storage location to the target storage location occurring in the background. In general, the written data is handled with higher priority than background copying. Note that data written by a host is already available in RAM for sending over the network, and thus reading back from a disk is not necessary. With respect to obtaining reads on demand, any on demand reads needed by the target virtual machine host are serviced with higher priority than background copying, which continues until the data is done copying, e.g., the end of the virtual disk is reached.

Writes may need to be throttled based on the network transmission capability, otherwise the writes to the virtual disk may not be able to be transferred to the target storage location as fast as they come in. Moreover, data writes transferred to the target storage location need to be throttled to the extent that some background copy progress can be made by staying below the network transfer rate. One way to do this is to interleave background copy writes with write-through writes. Various ways to throttle writes may be used, including mirroring writes, using a queue with a certain queue depth to limit the number of writes and then reducing the queue depth, and so on.

Thus, while the virtual disk is being used by the source virtual machine host, data written by source software (e.g., a virtual machine) can optionally also be immediately written through to the target storage location. As a result, in one alternative, a background copy operation may function without needing to track which data is dirtied by new writes, since those writes are immediately sent to the target storage location. Note however that some data that had already been written through to the target storage location may be sent again by the agent to the target storage location when the background copying operation reaches that data. An alternative is to track the writes so that the background copy operation can skip over any portion of data that has already been written through to the target storage location.

Another alternative is to only mirror writes that occur to offsets below an offset that tracks which portion of the virtual disk has been background copied to the target storage location. In this alternative, repeated writes to the same location may still result in repeated transfers, but only if the writes are in the region of the virtual disk that has already been previously copied. However, this alternative does prevent the background copy operation from itself re-copying any region, because it had not previously been copied since the background copy point had not reached that region yet.

However, relatively low performance may exist when using write-through, because a write to the source storage location needs to wait until the written data is transferred to the target storage location and a response is received, for example. Moreover, storage writes may occur one at a time using relatively small writes, requiring many round-trips over the network to and from the target.

Another way to transfer data while the source is still using the virtual storage is to have any data written at the source location collected and tracked as "dirty regions." Then, only written-over (dirtied) regions that were previously sent to the target storage location by the background copying operation need to be re-sent. However, the re-sending of such regions need not be immediate, and need not occur before the storage write is reported back to the source as being complete. This provides higher performance, as virtual machine storage writes and network writes are decoupled. Further, when the storage write rate is less than the network transfer rate, and when the backlog of dirtied data is not too large, any written dirty data can be cached in RAM for sending over the network, without requiring a read-back from disk.

When transferring data while tracking dirtied regions, a chain of differencing ("diff") files may be sent, (comprising "snapshots" once created), in which each next differencing file contains only the changes relative to the previous differencing file. This provides a difference tree that is transferred, with each differencing file typically growing smaller than the previous one. Note that snapshots being created as part of the migration process may need to be managed along with snapshots created for other reasons, such that an entire snapshot tree associated with the virtual machine is migrated. Written dirty data is tracked separately, e.g., via an in-memory data structure (or possibly a separate virtual disk layer). Ideally, any dirty tracking layer will avoid storing both versions of any dirtied data, and will shrink back toward zero space usage when dirtied data has been transferred to the target (as the amount of dirty data shrinks).

However, in addition to being somewhat complex because of the tracking of dirtied data, each differencing file may actually be larger than the previous one if the writes to the virtual disk at the source location are occurring faster than the transfer to the target storage location. If the write rate exceeds the network transfer rate, the amount of dirty data will never automatically be reduced to zero. To achieve reduction to zero, some throttling of the writes needs to be performed as described above.

Turning to various aspects related to virtual machine migration and virtual storage migration between two hosts, as described above with reference to FIG. 1, the movement of storage data is decoupled from the movement of virtual machine execution. Thus, the virtual machine execution can move before, during, or after movement of the storage data.

When the virtual machine execution moves before movement of the storage data, the virtual machine becomes dependent on two virtual machine hosts, as well as the network connecting them for continued execution. However, this situation persists only for the duration of storage data transfer, (unlike previous solutions in which a virtual machine is continuously dependent on a SAN LUN and the associated storage network).

Data read requests are serviced from data stored on the target storage location if it has the data region requested. Otherwise, only the source virtual machine host's storage location has the data and reads are thus serviced from the source virtual machine host. However, as described below with reference to FIGS. 4-6, there are situations in which some (e.g., read-only) data is maintained at a location that is commonly accessible to both the target virtual machine host and the source virtual machine host, whereby the target virtual machine host services reads from that commonly accessible location (unless for some reason it is less efficient to do so and this situation can be detected). Similarly, reads will be serviced from a location accessible to the target virtual machine host if the source virtual machine host does not have the requested region (e.g., access is temporarily unavailable. Note that wherever the virtual disk is not populated in a region, reads requested from that region are serviced by filling the read buffer with arbitrary (typically zeroed) data or by not modifying the read buffer.

In the situation where the virtual machine execution moves while the storage data is also moving, the virtual machine is dependent on the two virtual machine hosts and the connecting network only for the remainder of the storage transfer time (not during any portion of the storage data transfer that occurred before the virtual machine execution moves). During the portion of the data transfer after the virtual machine execution has moved, reads are serviced the same way as if the virtual machine execution moved before any storage data, as described above.

Note that having the virtual machine execution move before or during the storage migration provides flexibility that allows most of the CPU load associated with a virtual machine to be moved from one virtual machine host to another without requiring that the storage data be moved first. This may be advantageous in many scenarios, and can be performed as long as the dependence on two virtual machine hosts and the connecting network is acceptable during the data transfer period. The source and target virtual machine hosts only need to communicate during a storage migration operation while the storage is split between the two virtual machine hosts, and they only need to communicate when a virtual machine is running on one virtual machine host while any part of its storage is on the other virtual machine host. At other times, there is no need for the virtual machine hosts to communicate.

In the situation where the virtual machine execution moves after the storage data is fully moved, the virtual machine is only ever dependent on one virtual machine host at a time, and only briefly dependent on network connectivity. In this case, the virtual machine never executes separately from the storage data. Reads can be serviced from locally-stored data, or from a location that is commonly-accessible to both the source and the target virtual machine hosts.

Figure 4:
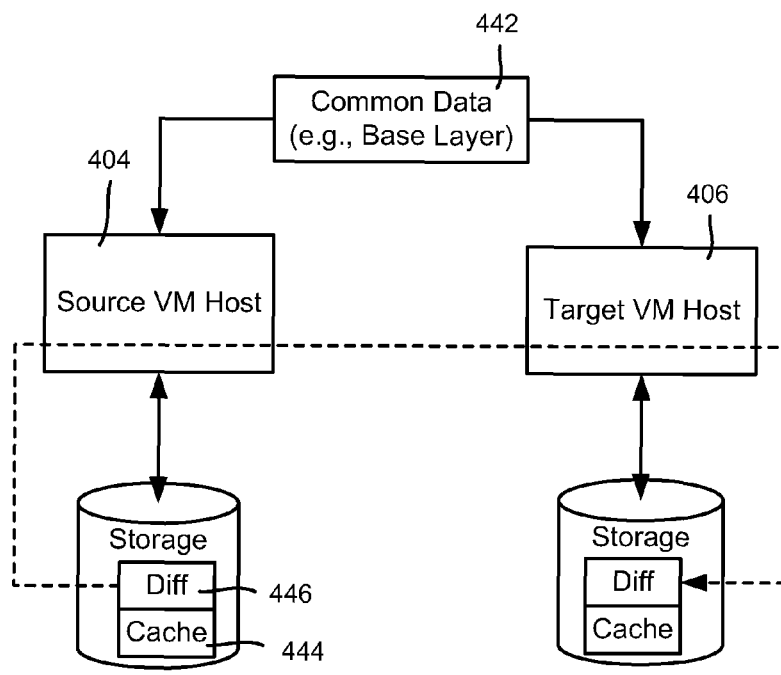
FIG. 4 is a block diagram showing example components for migrating virtual storage data from a from a source storage location to a target storage location wherein some of the virtual storage data is maintained in a base layer accessible to different computer systems.

FIG. 4 shows an implementation in which some data 442 of the virtual disk is already commonly accessible to both a source host 404 and a target host 406. For example, in some configurations, a virtual disk is formed via a base layer, which may be commonly accessible, with one or more difference (diff) layers 446 containing changes to the base layer, some of which may be cached (block 444). As is known, a virtual disk may be formed by using the most recent data, then the next most recent and so on until the base layer, which is the oldest layer. As described below with reference to FIGS. 5 and 6, only the diff layer 446 needs to be migrated to accomplish virtual disk migration. Note that FIG. 4 is different from FIG. 2, in that the source need not copy the data to the common data location, as it is already there.

Figure 5:
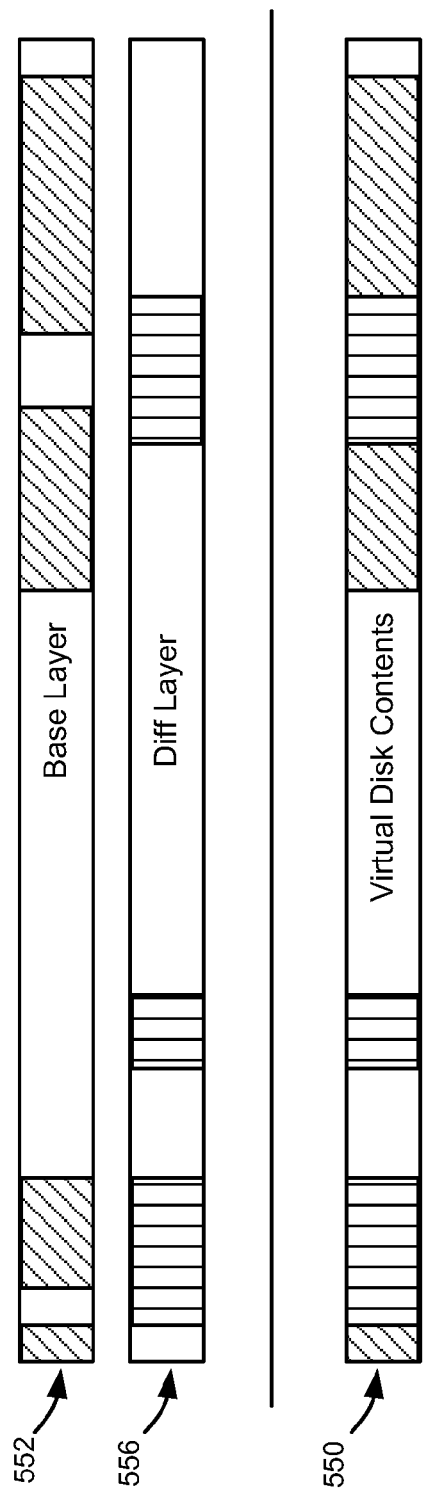
FIG. 5 is a representation of a layered virtual disk that may be migrated as in the example of FIG. 4.

In FIG. 5, for example, there is shown a virtual disk 550 with two layers 552 and 554, formed by using the data of the diff layer 554 wherever it exists, and then using the data of the base layer 552 when needed. In the context of virtual disk migration, the base layer 552 may represent data that already resides on or is accessible to the target virtual machine host 406, while the diff layer 554 may represent data that only resides on the source virtual machine host 404. Note that some or all of the overlapping regions between the two layers may contain identical data, and such identical regions may be tracked as identical, (although not shown in FIG. 5).

Figure 6:
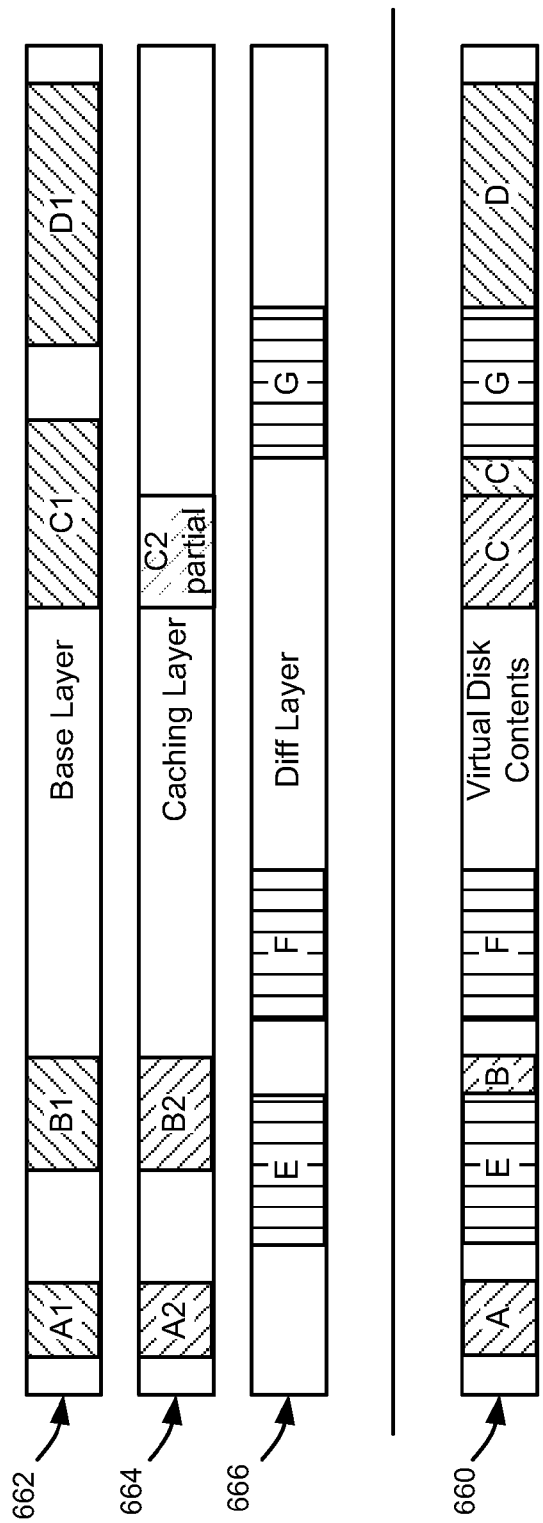
FIG. 6 is a representation of a layered virtual disk that may be migrated as in the example of FIG. 4.

FIG. 6 shows a virtual disk 660 with three layers. In such a configuration, the source virtual machine host 404 caches data from the base layer, up to and possibly including the entire base layer. With respect to efficient migration, the source virtual machine host 404 need not send any of the cached data to the target virtual machine host if the data can be more efficiently obtained by the target virtual machine host directly from the original (commonly accessible) base layer. This works because the base layer and data cached from the base layer are identical.

In the example of FIG. 6, the base layer 662 represents the layer that is commonly accessible to both the source host 404 and the target host 406. The caching layer 664 represents some (or possibly all) of the data that the source host 404 has cached from the base layer 662, and which is identical to the base layer in any overlapping regions; (note that in FIG. 6, only some of the base layer's data has been cached). The difference (diff) layer 666 represents data that is only present on the source virtual machine host 404. When storage migration begins from the source virtual machine host 404 to the target virtual machine host 406, only the data in the diff layer 666 is copied, because the caching layer 664 does not need to be copied, nor does the base layer 662 because the target virtual machine host 406 can access the base layer without going through the source virtual machine host 404.

Note that there are other arrangements for virtual disk layering in which a layer is mirrored between two storage locations, instead of (as in FIG. 6) using two separate layers for the same purpose. Such other arrangements may be similarly used for efficient migration.

For efficiency, the source virtual machine host 404 may send descriptions of which regions of the virtual disk are backed by virtual disk data layers held only by the source virtual machine host 404, and/or descriptions of the regions of data that are available on at least one other source. The target virtual machine host 406 caches these descriptions and may then use the descriptions to avoid querying the source virtual machine host 404 for data in regions in which the source virtual machine host 404 does not have data. Moreover, if the descriptions identify more than one source, the target virtual machine host 406 can use the descriptions to choose a source from which to copy data. These descriptions may be sent from the source virtual machine host 404 to the target virtual machine host 406 automatically, or in response to a specific query by the target virtual machine host 406.

Turning to another aspect, there may be situations in which the direction of migration needs to reverse before migration is complete, e.g., the virtual machine migration is cancelled or reversed by an administrator or automated action. In these situations, copying in the original direction stops, and the source storage location (e.g., "A") and target storage location (e.g., "B") switch roles, such that any data that is stored only on B begins getting copied to A. There may be little or no data on B that is not also on A, in which event the reversed copy operation is very fast.

Figure 7:
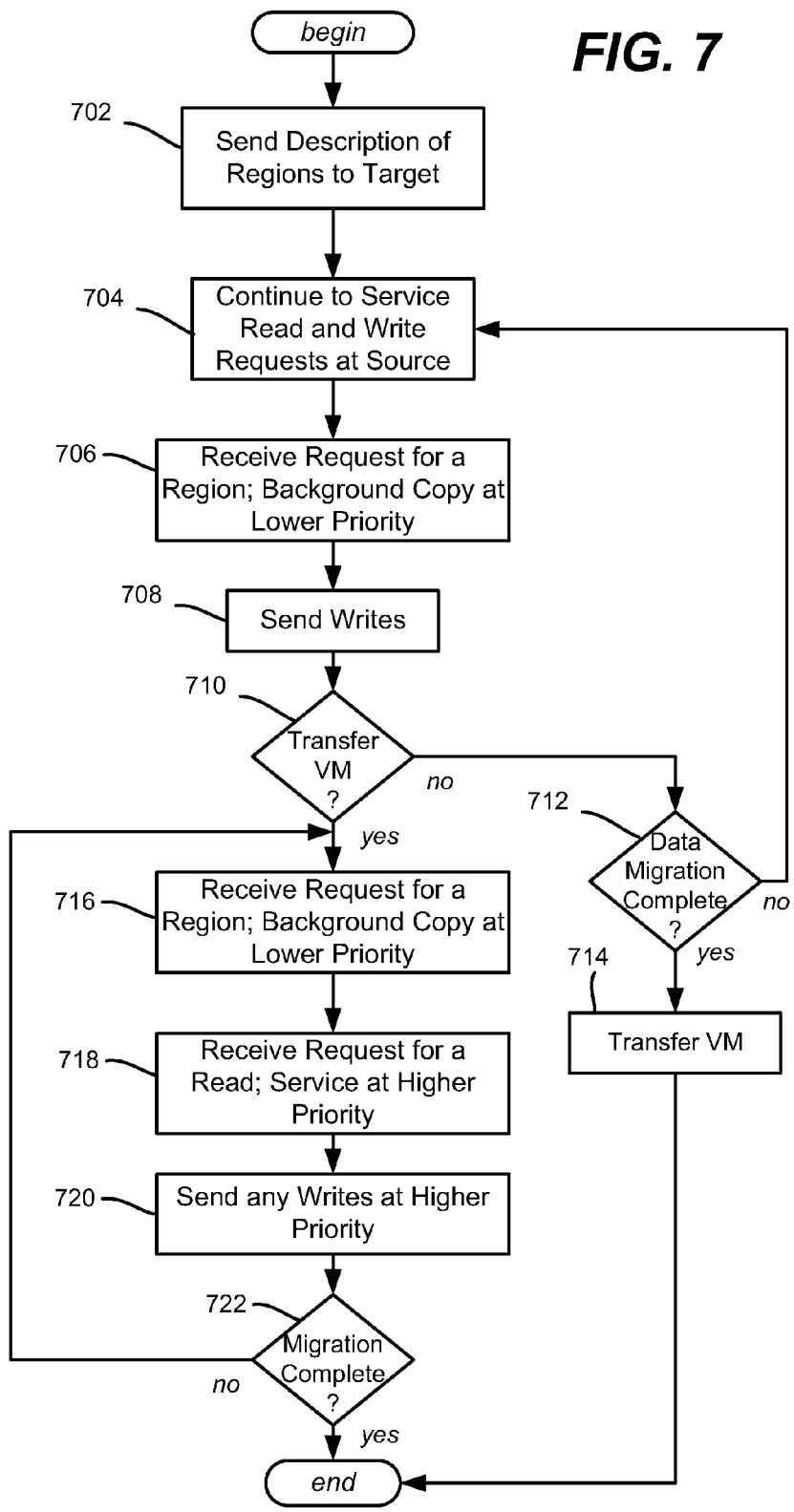
FIG. 7 is a flow diagram showing example steps that may be taken as part of a virtual storage migration.

FIG. 7 is a flow diagram showing example steps that may take place in an example virtual storage migration process, beginning at step 702 where the agent sends descriptions of regions that the target storage location will need. As represented by step 704, the source storage location still continues to be accessible and may be used for servicing reads and writes.

Step 706 represents performing the background copy operation for any region requested by the target (note that there may not be any such request at this time, such as if migration is going to occur right away, before any data transfer. Note that background copying may be driven by the target/agent (internal or external) pulling data (as shown in step 706), or by the source/agent pushing data.

Step 708 represents mirroring or otherwise sending writes to the target host, which includes any necessary throttling. Note that mirroring is only one option, and, for example, the source may only send writes to the target host that have overwritten previously background-copied data.

Step 710 represents determining whether a virtual machine (or other program) accessing the virtual disk is to be transferred to a target host, which as described above, may occur before, during or after any data migration, e.g., as controlled by an administrator or other agent. If not transferred until after the data transfer is complete as evaluated at step 712, then the virtual machine transfer (step 714) only occurs when data migration is complete, otherwise the process branches back to step 704 where the source virtual machine host continues running the virtual machine with the virtual hard disk, with the performing of background copying and the sending of writes.

If instead at step 710 the virtual machine using the virtual hard disk is to be transferred, step 716 is performed (e.g., by an external agent or internal source/target agents) to continue performing background copying for any appropriate regions. Any read requests for read data now needed by the target virtual machine host are sent back to the source virtual machine host, where they are received and serviced by the source virtual machine host via (step 718). Any writes that are still directed towards the source virtual machine host (e.g., pending) are sent to the target virtual machine host at step 720. Migration is complete at step 722 when the virtual hard disk data is fully transferred to the target storage location (including any commonly accessible location or locations).

Exemplary Operating Environment

Figure 8:
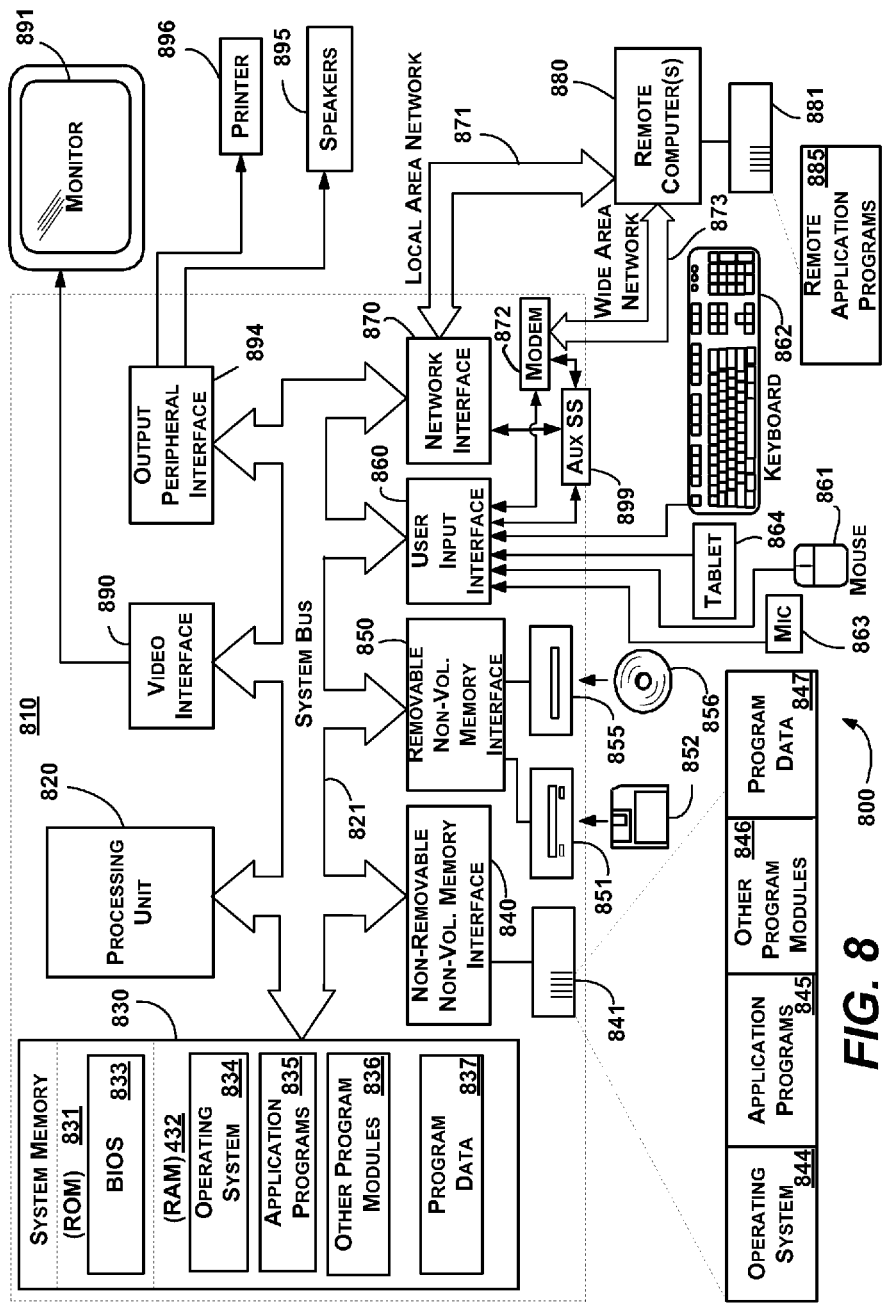
FIG. 8 shows an illustrative example of a computing environment into which various aspects of the present invention may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:
    migrating a virtual machine and a storage component of the virtual machine from a source location to a target location;
    while the virtual machine is running on at least one of the source location and the target location, migrating data in the storage component from the source location to the target location via a temporary common location that is accessible to both the source location and the target location;
    receiving a request associated with data in the storage component of the virtual machine following completion of a migration of a first portion of the data in the storage component to the target location and completion of a migration of a second portion of the data in the storage component to the temporary common location;
    on condition that the received request is associated with the first portion of data in the storage component that has been migrated to the target location, accessing the target location to service the request; and
    on condition that the request is associated with data in the storage component is associated with the second portion of the data in the storage component that has not been migrated to the target location, accessing the temporary common location accessible to both the source location and the target location to service the request.

2. The method of claim 1, further comprising:
    background copying the data in the storage component of the virtual machine from the source location to the target location at a first priority; and
    sending written data corresponding to newly-written writes directed towards the source location to the target location at a second priority that is at least as high as the first priority, the request being a write request.

3. The method of claim 2, further comprising throttling the migration of at least a portion of the storage component of the virtual machine to control a rate of transfer of the newly-written writes.

4. The method of claim 2, further comprising throttling the background copying from the source location to the target location to utilize less than a maximum transfer rate of a network over which the background copy is occurring.

5. The method of claim 1, further comprising background copying the data located in the storage component of the virtual machine from the source location to the target location at a first priority, wherein accessing the source location or the another location accessible to the target location comprises servicing the request at a second priority that is at least as high as the first priority, the request being a read request.

6. The method of claim 5, further comprising throttling a sending of read data corresponding to the read request to control a rate of transfer via a network over which the read request is occurring.

7. The method of claim 1, further comprising controlling migration of the virtual machine, wherein the virtual machine is configured to migrate during the migration of the data in the storage component of the virtual machine.

8. The method of claim 1, further comprising obtaining one or more descriptions of data regions from at least one of the source location or the another location.

9. One or more computer storage devices having computer-executable instructions that are executable by a computer to cause the computer to perform operations for migrating a virtual machine and a virtual hard disk from a source location to a target location, the operations comprising:
    copying virtual hard disk data from the source location to the target location via a temporary common location that is accessible to both the source location and the target location while the virtual machine is running on one or more of the source location and the target location; and
    receiving a request for accessing the virtual hard disk data following completion of a migration of a first portion of the virtual hard disk data to the target location and completion of a migration of a second portion of the virtual hard disk data to the temporary common location;
        determining whether the request is a read request for accessing the first portion of the virtual hard disk data that has already been migrated to the target location;
        on condition that the received read request is associated with the first portion of the virtual hard disk data that has been migrated to the target location, accessing the first portion of the virtual hard disk data at the target location to service the read request; and
        on condition that the received read request is associated with the second portion of the virtual hard disk data that has been migrated to the temporary location, accessing the second portion of the hard disk data at the temporary common location to service the read request.

10. The one or more computer storage devices of claim 9 having further computer-executable instructions that are executable by the computer to cause the computer to perform operations comprising sending newly-written writes directed towards the source location as written data to the target location, wherein the sending of the newly-written writes occurs at a priority that is at least as high as a priority of the copying.

11. The one or more computer storage devices of claim 9 having further computer-executable instructions that are executable by the computer to cause the computer to perform operations comprising:
    sending newly-written writes directed towards the source location as written data to the target location over a network; and
    throttling to control a rate of transfer of the newly-written writes.

12. The one or more computer storage devices of claim 9 having further computer-executable instructions that are executable by the computer to cause the computer to perform operations comprising reading at least some data from a base layer of the virtual hard disk that is accessible by the target location into the target location without sending that data from the source location.

13. The one or more computer storage devices of claim 9 having further computer-executable instructions that are executable by the computer to cause the computer to perform operations comprising obtaining descriptions of data regions that the target location needs from at least one of the source location or the another location.

14. The one or more computer storage devices of claim 9 having further computer-executable instructions that are executable by the computer to cause the computer to perform operations comprising tracking dirty regions corresponding to writes that the target location needs to obtain from the source location.

15. In a computing environment, a system for migrating a virtual machine and a virtual hard disk from a source virtual machine host to a target virtual machine host, said system comprising:
   a memory storing data associated with one or more virtual machines and one or more virtual hard disks; and
   one or more agents configured to:
      copy virtual hard disk data from the source virtual machine host to the target virtual machine host via a temporary common virtual machine host that is accessible to both the source virtual machine host and the target virtual machine host while a virtual machine associated with the virtual hard disk data is running on one or more of the source virtual machine host and the target virtual machine host;
      receive a read request for accessing the virtual hard disk data following completion of a migration of a first portion of the virtual hard disk data to the target virtual machine host and completion of a migration of a second portion of the virtual hard disk data to the temporary virtual machine host;
      determine whether the request is a read request for accessing the first portion of the virtual hard disk data that has already been migrated to the target virtual machine host;
      on condition that the read request is associated with the first portion of the virtual hard disk data has been migrated to the target virtual machine host, access the first portion of the virtual hard disk data that has already been copied to the target virtual machine host to service the read request; and
      on condition that the read request is associated with the second portion of the virtual hard disk data that has been migrated to the temporary virtual machine host, access the second portion of the virtual hard disk data that has already been copied to the temporary common virtual machine host to service the read request.

16. The system of claim 15, wherein the one or more agents are configured to send newly-written writes directed towards the source virtual machine host as written data to the target virtual machine host, wherein the sending of the newly-written writes occurs at a priority that is at least as high as a priority of the copying.

17. The system of claim 15, wherein the one or more agents are configured to:
   send newly-written writes directed towards the source virtual machine host as written data to the target virtual machine host over a network; and
   throttle to control a rate of transfer of the newly-written writes.

18. The system of claim 15, wherein the one or more agents are configured to read at least some data from a base layer of the virtual hard disk that is accessible by the target virtual machine host into the target virtual machine host without sending that data from the source virtual machine host.

19. The system of claim 15, wherein the one or more agents are configured to obtain descriptions of data regions that the target virtual machine host needs from at least one of the source virtual machine host or the another virtual machine host.

20. The system of claim 15, wherein the one or more agents are configured to track dirty regions corresponding to writes that the target virtual machine host needs to obtain from the source virtual machine host.

* * * * *